United States Patent
Hayashi et al.

(10) Patent No.: US 10,769,308 B2
(45) Date of Patent: *Sep. 8, 2020

(54) TECHNIQUE USED IN TEXT ANALYSIS IN A SAFE MANNER

(71) Applicant: International Business Machines Corporation, Armonk, NY (US)

(72) Inventors: Daisuke Hayashi, Tokyo (JP); Sayaka Tamai, Tokyo (JP); Keisuke Nitta, Koshigaya (JP); Fumihiko Terui, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 60 days.

This patent is subject to a terminal disclaimer.

(21) Appl. No.: 16/155,071

(22) Filed: Oct. 9, 2018

(65) Prior Publication Data

US 2019/0042792 A1 Feb. 7, 2019

Related U.S. Application Data

(63) Continuation of application No. 14/931,353, filed on Nov. 3, 2015, now Pat. No. 10,133,879.

(51) Int. Cl.
*G06F 17/20* (2006.01)
*G06F 21/62* (2013.01)
*G06F 40/157* (2020.01)

(52) U.S. Cl.
CPC ........ *G06F 21/6254* (2013.01); *G06F 40/157* (2020.01)

(58) Field of Classification Search
CPC .................................................. G06F 40/157
See application file for complete search history.

(56) References Cited

U.S. PATENT DOCUMENTS

| 2003/0018608 | A1* | 1/2003 | Rice ........................ G06F 21/14 |
| 2007/0174766 | A1  | 7/2007 | Rubin |
| 2009/0018820 | A1* | 1/2009 | Sato .................... G06F 21/6245 704/9 |

(Continued)

FOREIGN PATENT DOCUMENTS

JP 2015059984 A 3/2015

OTHER PUBLICATIONS

List of IBM Patents or Patent Applications Treated as Related. Filed Oct. 9, 2018. 2 pages.

*Primary Examiner* — Keith D Bloomquist
(74) *Attorney, Agent, or Firm* — Robert J. Shatto

(57) ABSTRACT

A first character string in a logic, wherein the logic is a rule which analyzes input text and extracts additional information used for the text analysis, used for the text analysis with a second character string which is different form the first character string is replaced using a mapping between the first character string and the second character string. The first character string being a character or a combination of characters in a logic. A first character string is searched for in a target document for the text analysis and the first character string, if found, is replaced with the second character string, using the mapping. The logic is sent after the replacement to a server computer. The target document after the replacement is sent to the server computer. A text analysis result for the target document after the replacement is received form the server computer.

20 Claims, 14 Drawing Sheets

(56) References Cited

U.S. PATENT DOCUMENTS

| | | |
|---|---|---|
| 2009/0235199 A1 | 9/2009 | Mastie |
| 2012/0246696 A1* | 9/2012 | Boukobza ............ G06F 21/6245 |
| | | 726/1 |
| 2013/0024769 A1* | 1/2013 | Sumida ............... G06F 21/6209 |
| | | 715/255 |
| 2013/0125247 A1 | 5/2013 | Sprague |
| 2014/0172806 A1* | 6/2014 | Wilding .............. G06F 21/6245 |
| | | 707/693 |
| 2017/0124037 A1 | 5/2017 | Hayashi |

* cited by examiner

TECHNIQUE USED IN TEXT ANALYSIS IN A SAFE MANNER

BACKGROUND

The present invention relates to a technique used in a text analysis, and more specifically, to a technique used in a text analysis in a safe manner.

SUMMARY

Embodiments of the present invention include a computer program product in text analysis. In one embodiment, the computer program product includes one or more computer readable storage media and program instructions stored on the one or more computer readable storage media. In one embodiment, the program instructions include the following. Program instructions to replace a first character string in a logic, wherein the logic is a rule which analyzes input text and extracts additional information used for the text analysis, used for the text analysis with a second character string which is different from the first character string, using a mapping between the first character string and the second character string. The first character string being a character or a combination of characters in a logic. Program instructions to search for a first character string in a target document for the text analysis and replacing the first character string, if found, with the second character string, using the mapping. Program instructions to send the logic after the replacement to a server computer. Program instructions to send the target document after the replacement to the server computer. Program instructions to receive from the server computer a text analysis result for the target document after the replacement.

Embodiments of the present invention include a computer system for text analysis. In one embodiment, the computer system includes one or more computer processors, one or more computer readable storage media and program instructions stored on the one or more computer readable storage media for execution by at least one of the one or more computer processors. In one embodiment, the program instructions include the following. Program instructions to replace a first character string in a logic, wherein the logic is a rule which analyzes input text and extracts additional information used for the text analysis, used for the text analysis with a second character string which is different from the first character string, using a mapping between the first character string and the second character string. The first character string being a character or a combination of characters in a logic. Program instructions to search for a first character string in a target document for the text analysis and replacing the first character string, if found, with the second character string, using the mapping. Program instructions to send the logic after the replacement to a server computer. Program instructions to send the target document after the replacement to the server computer. Program instructions to receive from the server computer a text analysis result for the target document after the replacement.

DETAILED DESCRIPTION

Figure 1A:
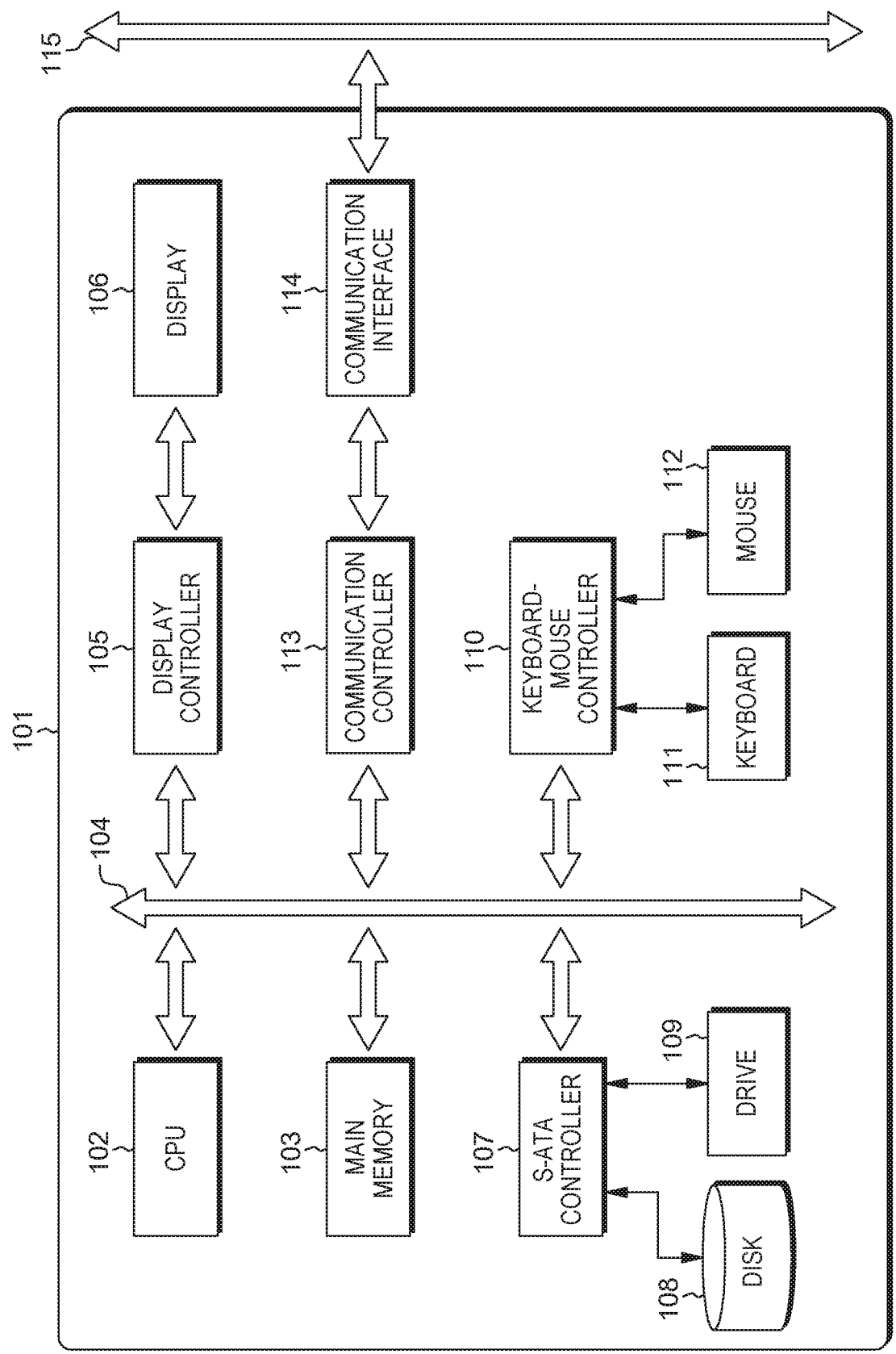
FIG. 1A illustrates an exemplified basic block diagram of a client device used in an embodiment of the present invention.

The present invention relates to a technique for a text analysis, and more specifically, to a technique for a text analysis in a safe manner.

Recently, text analysis for obtaining knowledge from unstructured documents has been developed and the necessity for performing more complicated analysis is increasing. In order to perform such complicated analysis, cloud services where a high computing performance can be served if desired may be suitable.

However, there is a security problem or risk, when data comprising personal or security data is sent to cloud services.

As a simple example, at the time of extracting a particular group of nouns from unstructured documents, it is necessary to prepare a dictionary for text analysis. However, there is a possibility that the dictionary itself includes personal or security data. Accordingly, there may be a leakage or security problem to send to cloud services not only a target document but also the dictionary for text analysis.

One embodiment of the present invention provides a technique for solving the leakage or security problem mentioned above. Further, one embodiment of the present invention provides a technique used for a text analysis in a safe manner.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

To define more clearly the terms used herein, the following exemplified definitions are provided, but the meaning of the terms should be interpreted broadly as known to the technical field to which the present invention relates.

The term, "text analysis" may refer to a process of deriving information from target documents. The text analysis includes, for example, obtaining a frequency of appearance of the term or performing text mining. The text analysis is used for several purposes, for example, but not limited to, summarization, sentiment analysis, explicative analysis, investigative analysis, or classification. The summarization may be done by trying to find a key content across a large body of information or a single target document. The sentiment analysis may refer to what is the nature of commentary on an issue. The explicative analysis may refer to what is driving that commentary. The investigative analysis may refer to what are particular cases of a specific issue. The classification may refer to what subject or what key content pieces does a text talk about.

The term, "a target document", may refer to a document to be analyzed for a text analysis. The target document may be a unit of discrete textual data within a collection that usually, but not necessarily, correlates with some real-world document. The document may be, such as any report including business report, economical repot, or company report: legal memorandum: e-mail: research paper; thesis paper including such as doctor or master thesis; manuscript; article; press release; or news story. The target document may be, for example, but not limited to, an unstructured document. A format of the target document may be any format, for example, but not limited to, a tag format, such as an XML or HTML format.

The term, "logic", may refer to a format or a rule which analyzes input text and extracts additional information for use of a text analysis. The logic may be, for example, but not limited to, a dictionary, a regular expression, or a program code, all of which are used for a text analysis. The logic may include a character or a combination of the characters. The character may be a character in a word. The combination of the character may be parts in a word, a word, or phrases. The logic may include a rule for a text analysis at a server computer where the text analysis is performed.

The dictionary may include one or more character strings, which may be a term or expression. The term or expression may be associated with one or more categories. Further, the term or expression may be associated with one or more sub-categories. The category may be, for example, but not limited to, part of speech, such as noun or verb; or proper noun. The sub-category may be, for example, but not limited to, a human name, a company name, or an area name. In one embodiment, the dictionary may comprise a term, a category of the term, and, optionally, a sub-category of the category. A format of the dictionary may be, for example, but not limited to, a term, a category of the term, and, optionally, a sub-category of the category. For example, the terms, "IBM" and "Japan", are respectively defined as follows: IBM, proper noun, company name; Japan, proper noun, country name.

The regular expression, regex, may refer to a sequence of characters which define a search pattern.

The program code is used for a text analysis in a server computer. The program code may be for defining an analysis rule for the text analysis.

Figure 1B:
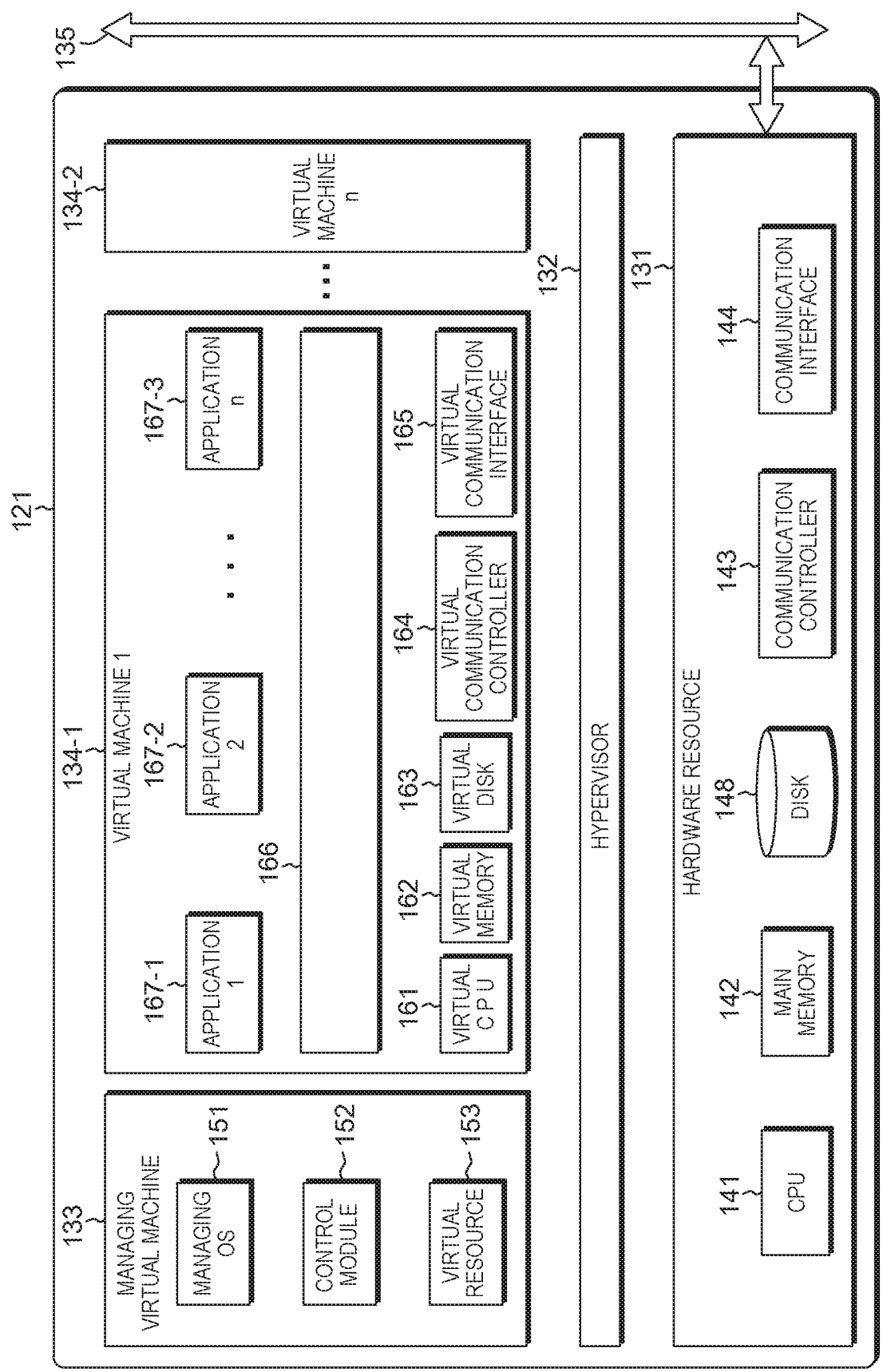
FIG. 1B illustrates an exemplified basic block diagram of a server computer used in an embodiment of the present invention.

FIGS. 1A and 1B illustrate exemplified basic block diagrams of a client device (101) and a server computer (121), respectively, used in an embodiment of the present invention.

With reference now to FIG. 1A, the client device (101) may be, for example, but is not limited to, a computer, such as a desktop, a laptop, or a notebook computer; a thin client; a tablet; a smart phone; a mobile phone; a game terminal; or an internet television. The client device (101) may comprise one or more CPUs (102) and a main memory (103) connected to a bus (104). The CPU (102) may be preferably based on a 32-bit or a 64-bit architecture. The CPU (102) may be, for example, but is not limited to, CPUs used for a tablet; a smart phone; a mobile phone; a game terminal; or an internet television.

A display (106) such as a liquid crystal display (LCD) may be connected to the bus (104) via a display controller (105). The display (106) may be used to display, for management of the computer, information on a computer connected to a network via a communication line and information on software running on the computer using an appropriate graphics interface. A disk (108) such as a hard disk or a solid state drive, SSD, and a drive (109) such as a CD, a DVD, or a BD (Blu-ray disk) drive may be connected to the bus (104) via an SATA or IDE controller (107). Further, a keyboard (111) and a mouse (112) may be connected to the bus (104) via a keyboard-mouse controller (110) or USB bus (not shown).

The drive (109) may be used to install a program, such as the computer program of an embodiment of the present invention, readable from a CD-ROM, a DVD-ROM, or a BD (Blu-ray Disk) to the disk (108) or to load any data readable from a CD-ROM, a DVD-ROM, or a BD into the main memory (103) or the disk (108), if necessary.

A communication interface (114) may be based on, for example, but is not limited to, the Ethernet® protocol. The communication interface (114) may be connected to the bus (104) via a communication controller (113), physically connects to the client device (101) to a communication line (115), and provides a network interface layer to the TCP/IP communication protocol of a communication function of the operating system of the client device (101). In this case, the communication line (115) may be a wired or a wireless LAN environment based on wireless LAN connectivity standards, for example, but is not limited to, IEEE® 802.11a/b/g/n ("IEEE" is a registered trademark of Institute of Electrical and Electronics Engineers, Inc. in the United States, other countries, or both).

The exemplified basic block diagram applies also to a server computer described in the following FIG. 1B.

With reference now to FIG. 1B, the server computer (121) may be, for example, but is not limited to, a workstation, a rack-mount type server, a blade type server, or a mainframe server. The server computer (121) may run a virtual machine or cloud computing for text analysis.

The server computer (121) may comprise a hardware resource (131), a hypervisor (132), called a virtual machine monitor or a virtual operating system, a managing virtual machine (133), called a domain-0 or a parent partition, and one or more virtual machines 1 to n (134-1 to 134-2), called a domain-U or a child partition.

The hardware resource (131) may comprise one or more CPUs (141), a main memory (142), a disk (148) such as a hard disk or a solid state drive, SSD, a communication controller (143), and a communication interface (144). The CPU (141), the main memory (142), the disk (148), the communication controller (143), and the communication interface (144) may correspond to the CPU (102), the main memory (103), the disk (108), the communication controller (113), and the communication interface (114) described in FIG. 1A, respectively.

The hypervisor (132) may, for example, be a part of a computer software, firmware or hardware which may create and run one or more virtual machines. The hypervisor may run directly on the hardware resource (131). The hypervisor (132) may manage a guest operating system (166). The hypervisor (132) may be realized by, for example, but is not limited to, a virtual software.

The managing virtual machine (133) may comprise, for example, a managing operating system (151), a control module (152), and a virtual resource (153). The control module (152) may run on the managing operating system (151) and issue a command to the hypervisor (132). The control module (152) may generate one or more virtual machines 1 to n, where n is any number of virtual machines (134-1, 134-2). Further, the control module (152) may issue a boot command for a guest operating system and control an operation of the virtual machine 1 to n (134-1 to 134-2). The virtual resource (153) may be a hardware resource assigned to the managing virtual machine (133).

The server computer (121) may implement at least one of the virtual machines 1 to n (134-1 to 134-2). The virtual machine 1 (134-1) may comprise a virtual resource, for example, but is not limited to, a virtual CPU (161), a virtual memory (162), a virtual disk (163), a virtual communication controller (164) and a virtual communication interface (165). Further, The virtual machine 1 (134-1) may comprise, for example, but is not limited to, the guest operating system (166) and one or more application(s) 1 to n (167-1 to 167-3).

The guest operating system (166) may run on the virtual machine 1 (134-1). The same applies also to other virtual machines, such as the virtual machine n (134-2).

One or more applications (167-1, 167-2, and 167-3) may run on the guest operating system (166). The computer program of an embodiment of the present invention may be implemented as one of the applications (167-1, 167-2, and 167-3).

One embodiment of the present invention, the client device (101) may connect to the virtual machine implemented on the server computer (121), via such as an internet or an intranet.

FIGS. 2A, 2B, 2C, 3A, 3B, 4, and 6 illustrate exemplified embodiments of a flow chart performed by the client device (101). FIGS. 5A and 5B illustrate exemplified embodiments of a flow chart performed by the server computer (121).

Figure 2A:
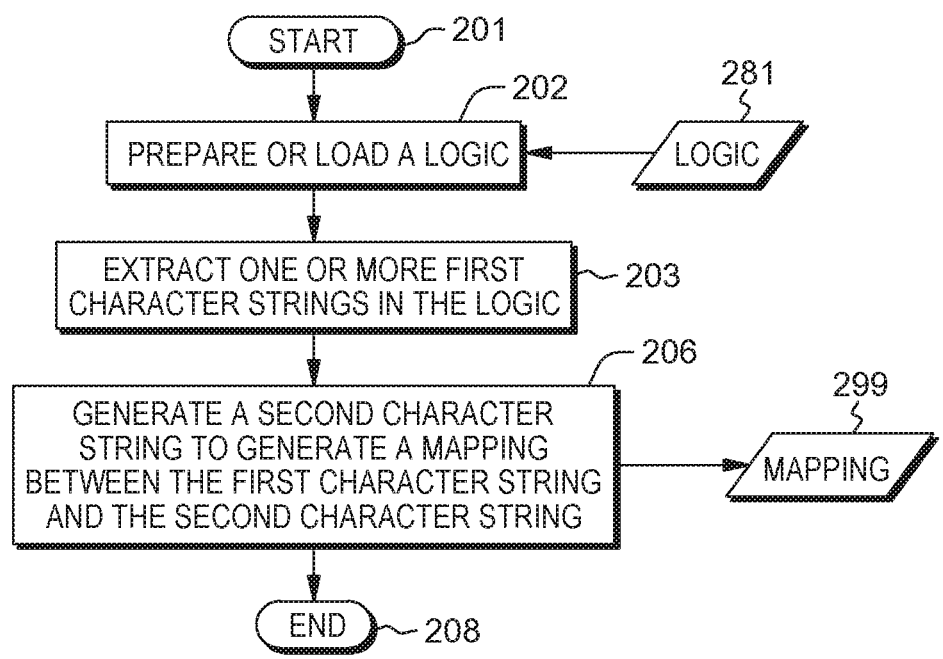
FIG. 2A illustrates one embodiment of a flowchart of a process, performed in the client device, for generating a mapping.
Figure 2B:
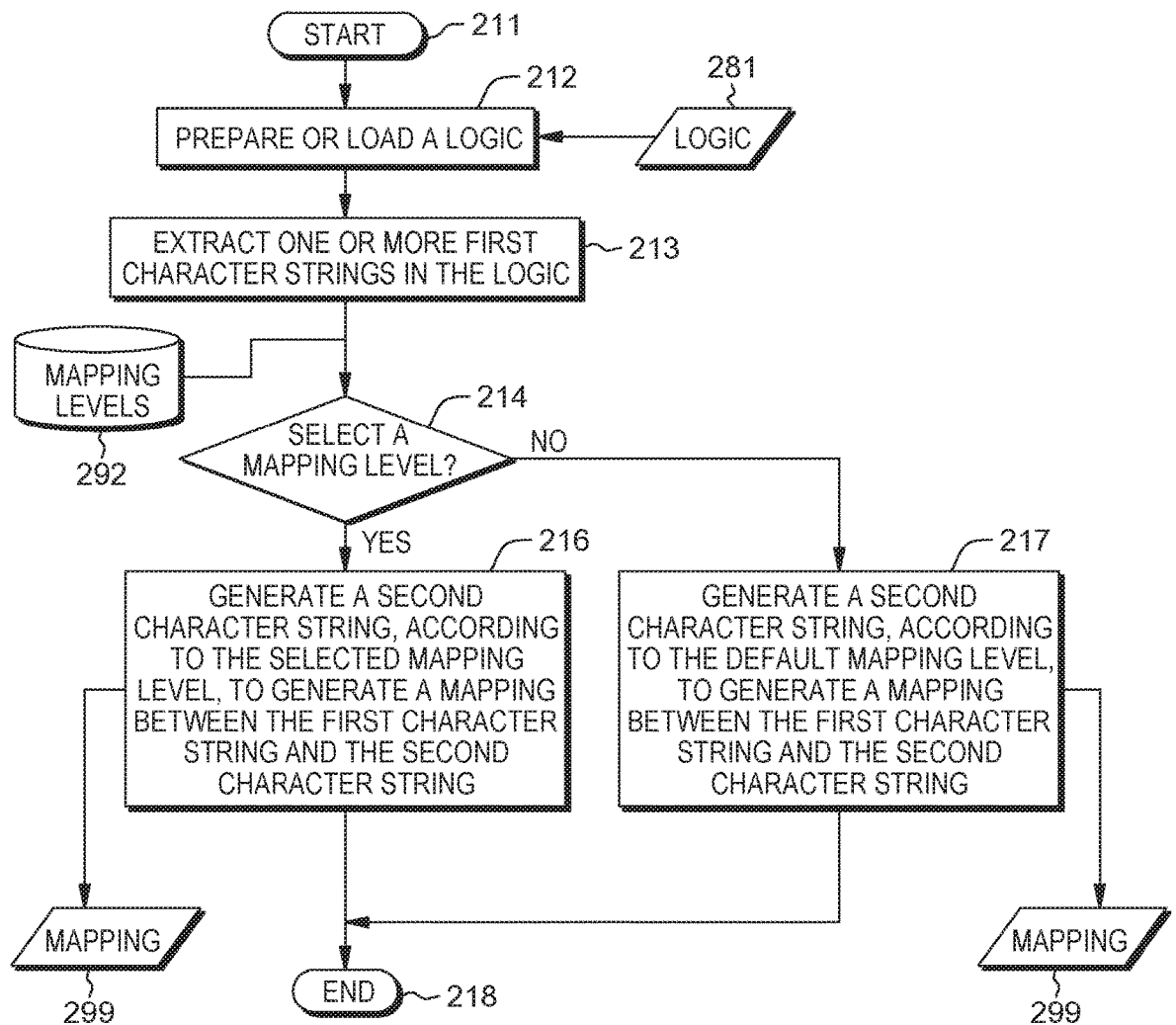
FIG. 2B illustrates another embodiment of a flowchart of a process, performed in the client device, for generating a mapping.
Figure 2C:
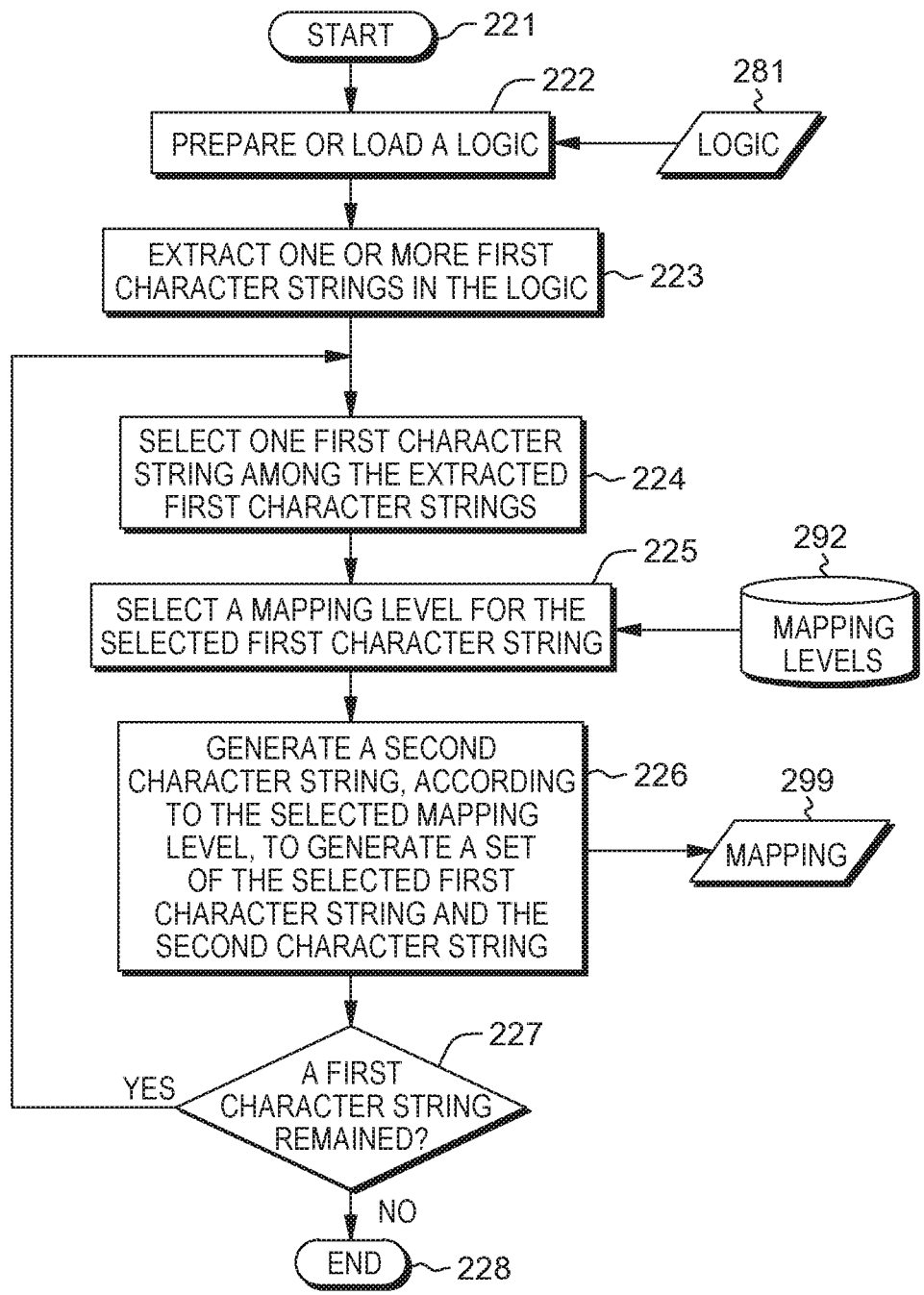
FIG. 2C illustrates another embodiment of a flowchart of a process, performed in the client device, for generating a mapping.

FIGS. 2A to 2C illustrates embodiments of a flowchart of a process for generating a mapping.

With reference now to FIG. 2A, in step 201, the client device (101) starts the process.

In step 202, the client device (101) may load or generate a logic, such as a dictionary, a regular expression, or a program code, all of which are used for a text analysis. The client device (101) may load the logic (281) from a storage, such as a disk (108). Alternatively, the client device (101) may generate a logic, according to an instruction from a user associated with the client device (101) or according to a purpose of the text analysis. The user may input a term to be included in a dictionary, or make a regular expression or a program code via a user interface of an application, such as text analysis application, running on the client device (101).

In step 203, the client device (101) may extract one or more first character strings from the logic (281). Alternatively, the user may select one or more first character strings from the logic (281). The first character string is a character string which originally exists in the logic (281).

If the logic (281) is a program code, the client device (101) may extract one or more first character strings a source code of the program code. Alternatively, the user may select one or more first character strings from the source code. The first character string is a character string which originally exists in the source code.

In one embodiment, the first character string may relate to personal or security data. The first character string may be a word or a phrase. As described below, the first string may be replaced with a second character string which may be a meaningless character string. The meaningless character may do not comprise personal related information, such as initial or age.

In step 206, the client device (101) may generate a second character string to generate a mapping (299) between the first character string and the second character string. Alternatively, the user may generate a second character string which corresponds to the first character string. As stated above, the second character string may be a meaningless character string. For making the second character string, one possible way is to select any character randomly. Another possible way is to replace a part or parts in the first string to one or more of other characters, or sorting the first string randomly. A length of the second character string may be the same or different from the first character string.

If there is a plurality of the first character strings, a plurality of second character strings is generated from each of the plurality of first character strings.

In one embodiment, the second string character may be a meaningless character string, as stated above. The meaningless character string may not relate to personal or security data.

The generated mapping is bidirectional mapping between the first character string and the second character string.

The mapping (299) is used for replacing a first character string in a logic with a second character string or vice versa. Further, the mapping (299) is used for replacing a first character string in a morphological analysis dictionary with a second character string or vice versa.

In step 208, the client device (101) terminates the process for generating the mapping (299).

With reference now to FIG. 2B, a mapping level among a plurality of mapping levels is used for generating a second character string.

In advance of starting a process for generating a mapping, the mapping levels are provided. An example of the mapping levels is explained below.

The mapping levels have, for example, levels 1 to 3, or levels 1 to 4, or levels 1 to 5. The more the number of levels increases, the more a computing cost for the client device (101) increases. However, a strong obfuscation may be attained as the number of levels increases.

In the following, an example of the mapping levels having levels 1 to 4 is shown. Mapping Level 1: (a) A mapping of a first character string in the logic to a second character string which may be a meaningless character string, without changing a length of the first character string. For example, each of the first character strings, the terms, "IBM", "US" and "JP", is mapped to a second character string, without changing a length of the term, as follows: IBM→xyz (3 characters); US→AA (2 characters); JP→BB (2 characters).

Mapping level 2: (b) A mapping of a first character string in the logic to a second character string which may be a meaningless character string, with changing a length of the first character string. For example, each of the first character string, the terms, "IBM", "US" and "JP", is mapped to a second character string, with changing a length of the term, as follows: IBM→xxyyz; US→acd; JP→abc.

Mapping Level 3: (c) A mapping of category and/or sub-category information relating to a first character string in the logic to a third character string which may be, for example, but not limited to a super ordinate concept or a meaningless character string, in addition to the replacement defined in (a) or (b). For example, each of category and sub-category information in an entity is mapped to a third string, in addition of a replacement of the terms, "IBM" with a second character string, with or without changing a length of the term, as follows: IBM, proper noun, corporate name→xyz, category-1, sub-category-1; IBM, proper noun, corporate name→xxyyz, category-1, sub-category-1. Here, "proper noun" refers to a category of the term, "IBM"; "corporate name" refers to a sub-category of the category "proper noun".

Mapping level 4: (d) A mapping of a first character string in a morphological analysis dictionary used for the text analysis to a second character string, in addition to the replacement defined in (a) or (b). For example, each character in an entity, "IBM is pleased to assist you.", in the morphological analysis dictionary is mapped to a second string, as follows: IBM→xyz; is →hij; pleased→qrs; to→zz; assist→klm; you→fgh. Here, "the term", "IBM" exists in the logic, and, accordingly, the term, "IBM" is mapped to "xyz", according to (a), if (a) is applicable.

With reference now back to FIG. 2B, in step 211, the client device (101) starts the process. Steps 212 and 213 correspond to the steps 201 and 203 in FIG. 2A, respectively. Accordingly, the explanation of the steps 201 and 203 is applied to the steps 212 and 213, respectively.

In step 214, the client device (101) determines whether a mapping level among a plurality of mapping levels (292) is selected or not. In one embodiment, a mapping level is automatically selected by the client device (101) among a plurality of mapping levels (292). Alternatively, a mapping level is selected by a user associated with the client device (101) among a plurality of mapping levels (292). If a higher level of a mapping level is selected, higher computing cost by the client device (101) is necessary, but a strong obfuscation may be attained. The strong obfuscation will decrease a possibility of presuming an original character string or a first character string from a second character string.

The mapping level may be selected, depending upon, for example, but not limited to, a context of a target document, an importance or category associated with a target document, an importance or category associated with a logic, an importance or category associated with a first character string, a calculation amount required in the client device (101), or a combination thereof. In an embodiment, if a context of a target document includes personal or security data, a higher mapping level may be selected. In an embodiment, if an importance associated with a target document, a logic or a first character string is higher, a higher mapping level may be selected. In an embodiment, if a category associated with a target document, a logic or a first character string is classified into a higher level, a higher mapping level may be selected. In an embodiment, if a computing cost of the client device (101) is lower, a lower mapping level will be selected.

If the determination is positive, the client device (101) proceeds to step 216. Meanwhile, if the determination is negative, the client device (101) proceeds to step 217.

In step 216, the client device (101) may generate a second character string, according to the selected mapping level, to generate a mapping (299) between the first character string and the second character string. Alternatively, the user may manually generate a second character string, according to the selected mapping level, to generate a mapping (299) between the first character string and the second character string. The user may input a second character string via a user interface of an application, such as text analysis application, running on the client device (101).

In step 217, the client device (101) may generate a second character string, according to the default mapping level, to generate a mapping (299) between the first character string and the second character string. The default mapping level may be Mapping Level 1 or 2, as described above. Alternatively, the user may manually generate a second character string, according to the selected mapping level, to generate a mapping (299) between the first character string and the second character string. The user may input a second character string via a user interface of an application, such as text analysis application, running on the client device (101).

In step 218, the client device (101) terminates the process for generating the mapping (299).

With reference now to FIG. 2C, a mapping level among a plurality of mapping levels is dynamically selected and the selected mapping level is used for generating a second character for each of the first character strings.

In step 221, the client device (101) starts the process.

Steps 222 and 223 correspond to the steps 201 and 203 in FIG. 2A, respectively. Accordingly, the explanation of the steps 201 and 203 is applied to the steps 212 and 213, respectively.

In step 224, the client device (101) selects one first character string among the extracted first character strings.

In step 225, the client device (101) determines a mapping level for the selected first character string among a plurality of mapping levels (292), depending upon, for example, but not limited to, an importance or category associated with the selected first character string. If an importance associated with the selected first character string is higher, a higher mapping level will be selected. If a category associated with the selected first character string is classified into a higher level, a higher mapping level will be selected.

In step 226, the client device (101) generates a second character string, according to the selected mapping level, to generate a mapping (299) which is a set of the selected first character string and the second character string.

In step 227, the client device (101) determines whether an unprocessed first character string remains or not. If the determination is positive, the client device (101) proceeds back to step 224 in order to repeatedly perform the steps 224 to 227. Meanwhile, if the determination is negative, the client device (101) proceeds to a final step 228.

In step 228, the client device (101) terminates the process for generating the mapping (299).

Figure 3A:
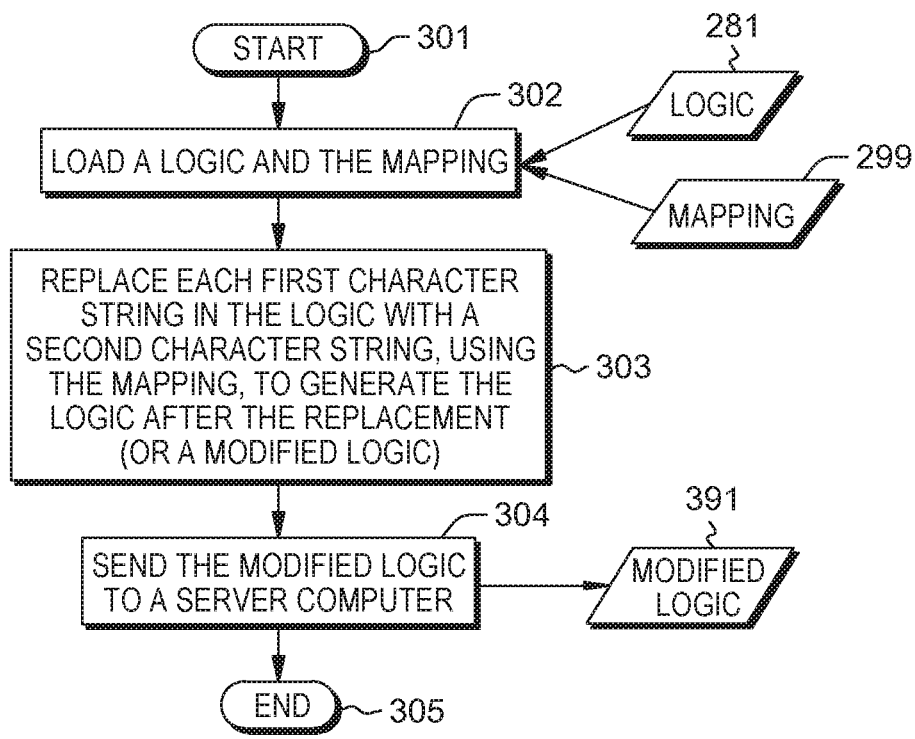
FIG. 3A illustrates one embodiment of a flowchart of a process, performed in the client device, for generating a modified logic to send the modified logic from the client device to the server computer.
Figure 3B:
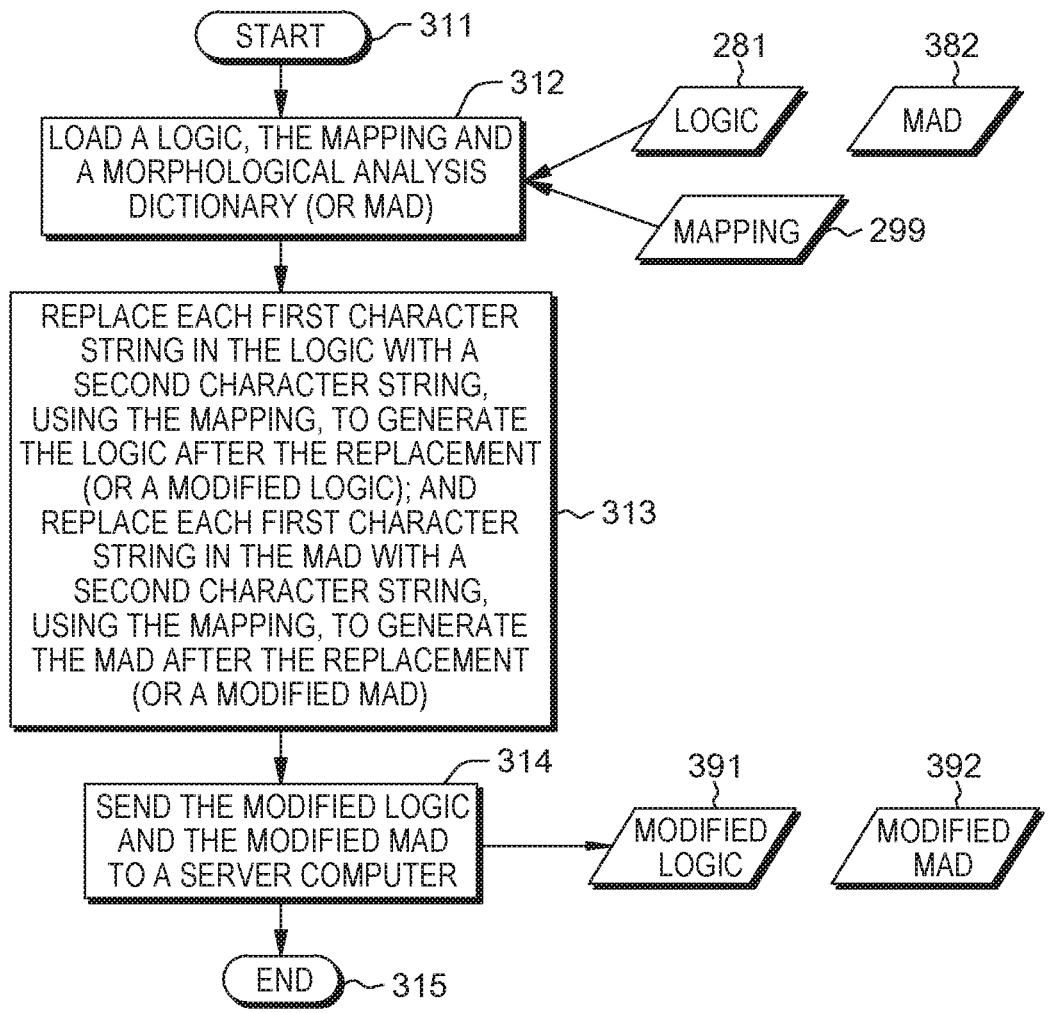
FIG. 3B illustrates another embodiment of a flowchart of a process, performed in the client device, for generating a modified logic and a modified morphological analysis dictionary from a logic and a morphological analysis dictionary, respectively, to send the modified logic and the modified morphological analysis dictionary from the client device to the server computer.

FIGS. 3A and 3B illustrate exemplified embodiments of a flow chart for generating a modified logic to send the modified logic from the client device to the server computer (121).

With reference now to FIG. 3A, in step 301, the client device (101) starts the process.

In step 302, the client device (101) may load the logic (281) and the mapping (299) simultaneously or separately.

In step 303, the client device (101) searches for a first character string in the logic (281), the first character string being listed in the mapping (299), and, if found, replaces each first character string in the logic (281) with a second character string, using the mapping (299), to generate the logic in which a first character string was replaced with a second character string. Accordingly, the logic after the replacement (hereinafter also referred to as "a modified logic") (391) is obtained.

In step 304, the client device (101) sends the modified logic (391) to a server computer. The server computer may be the server computer (121) where a text analysis is performed or an intermediate server where the modified target document (493) is sent to the server computer (121). Please note that the original logic (281) and the mapping (299) are never sent to the server computer (121) nor the intermediate server. The original logic (281) and the mapping (299) may be only stored in the client device (101). The original logic (281) and the mapping (299) may be encrypted for security reasons.

If the logic is a program code, the client device (101) first compiles the modified source code in which a first character string was replaced with a second character string to generate a program code. The client device (101) sends the generated program code to the server computer (121). The server computer may receive the generated program code and use the generated program code when the text analysis is performed.

In step 305, the client device (101) terminates the process for generating a modified logic to send the modified logic (391) from the client device (101) to the server computer (121).

With reference now to FIG. 3B, a modified morphological analysis dictionary is generated in addition to the modified logic, which is different from the process described in FIG. 3A.

In step 311, the client device (101) starts the process.

In step 312, the client device (101) may load the logic (281), the mapping (299), and a morphological analysis dictionary (382) simultaneously or separately.

In step 313, the client device (101) searches for a first character string in the logic (281), the first character string being listed in the mapping (299), and, if found, replaces each first character string in the logic (281) with a second character string, using the mapping (299), to generate the logic in which a first character string was replaced with a second character string. Accordingly, the logic after the replacement (hereinafter also referred to as "a modified logic") (391) is obtained.

Further, in step 313, the client device (101) searches for a first character string in the morphological analysis dictionary (382), the first character string being listed in the mapping, and, if found, replaces each first character string in the morphological analysis dictionary (382) with a second character string, using the mapping (299), to generate the morphological analysis dictionary in which a first character string was replaced with a second character string. Accordingly, the morphological analysis dictionary after the replacement (hereinafter also referred to as "a modified morphological analysis dictionary") (392) is obtained.

Further, any character strings other than the first character strings in the morphological analysis dictionary (382) may be replaced with other character strings, respectively, according to similar flowcharts described in FIGS. 2A to 2C.

If each first character string in the morphological analysis dictionary (382) is replaced with a second character string, the second string character for the logic should not be listed in the morphological analysis dictionary (382). This is because if the second string character for the logic is the same as that originally listed in the morphological analysis dictionary (382), an error result will be produced at a server computer where a text analysis is performed, using the modified morphological analysis dictionary (392).

In step 314, the client device (101) sends the modified logic (391) and the modified morphological analysis dictionary (392) to a server computer simultaneously or separately. The server computer may be the server computer (121) where a text analysis is performed or an intermediate server where the modified target document (493) is sent to the server computer (121). Please note that original logic (281) and the mapping (299) are never sent to the server computer (121) nor the intermediate server. The original logic (281) and the mapping (299) may be only stored in the client device (101). The original logic (281) and the mapping (299), respectively, may be encrypted for security reasons.

If the logic is a program code, the client device (101) first compiles the modified source code in which a first character string was replaced with a second character string to generate a program code which is used for a text analysis in the server computer. The client device (101) sends the generated program code and the modified morphological analysis dictionary (392) to the server computer (121) simultaneously or separately.

In step 315, the client device (101) terminates the process for generating a modified logic to send the modified logic (391) and the modified morphological analysis dictionary (392) from the client device (101) to the server computer (121).

Figure 4:
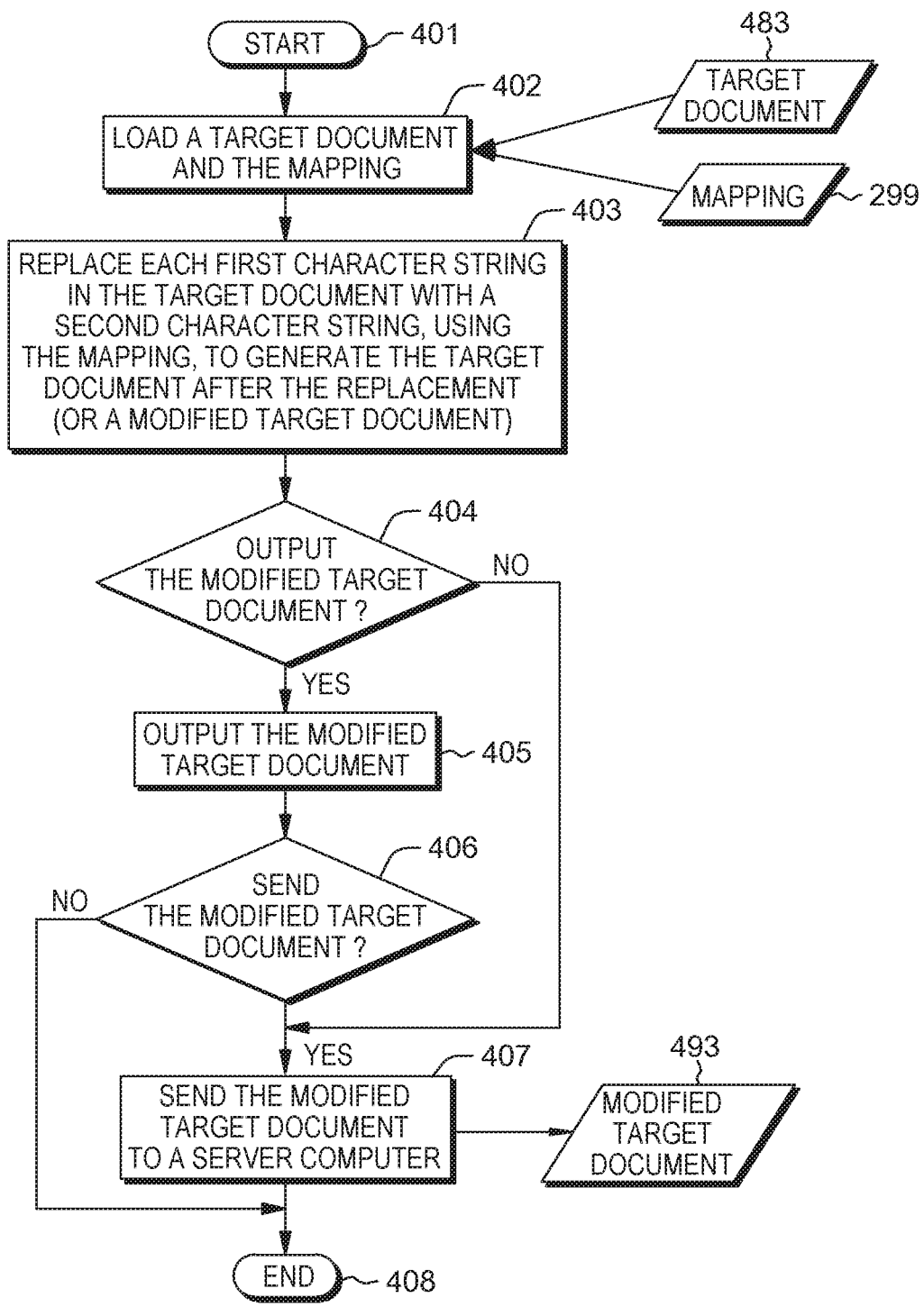
FIG. 4 illustrates one embodiment of a flowchart of a process, performed in the client device, for generating a modified target document from a target document to send the modified target document from the client device to the server computer.
Figure 5A:
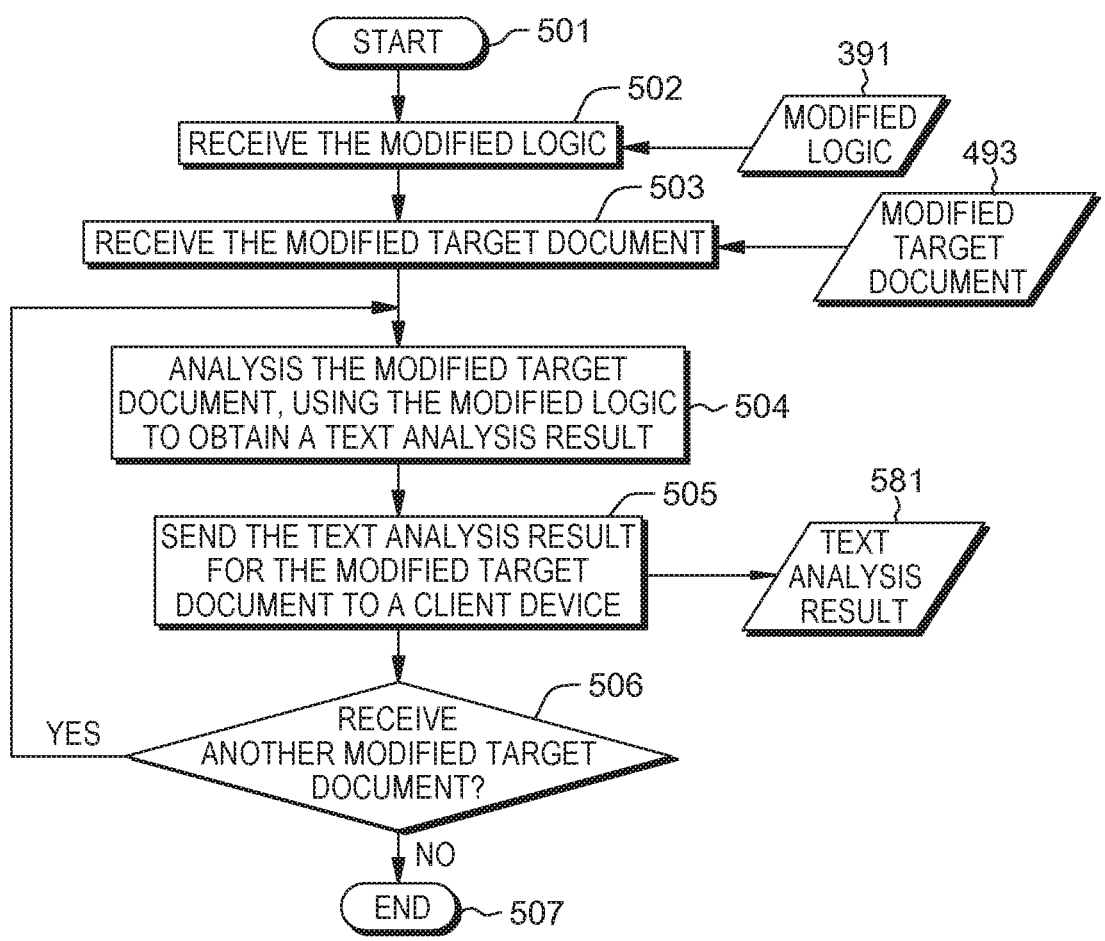
FIG. 5A illustrates one embodiment of a flowchart of a process, performed in the server computer, for analyzing the modified target document to send a text analysis result to the client device.
Figure 5B:
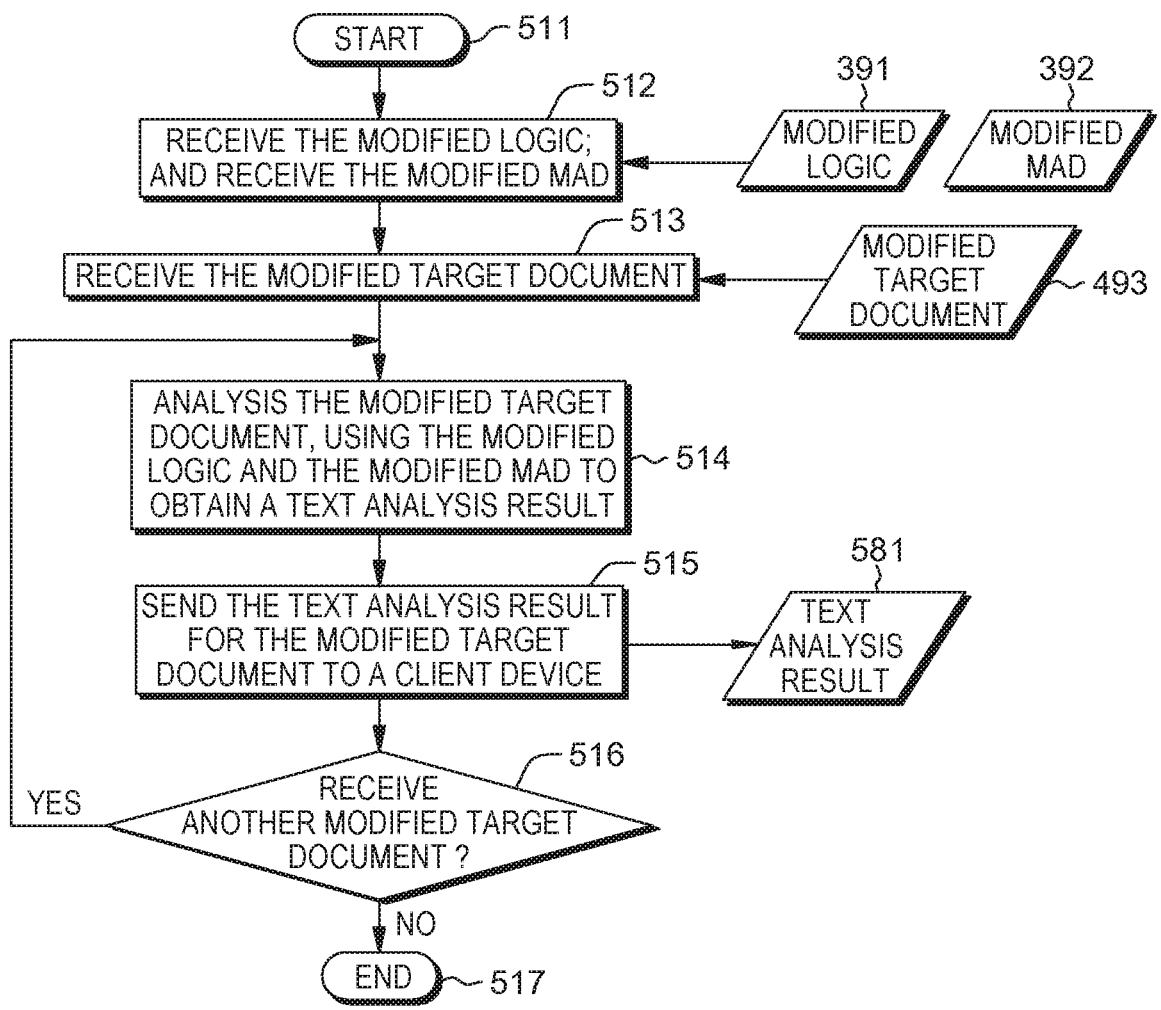
FIG. 5B illustrates one embodiment of a flowchart of a process, performed in the server computer, for analyzing the modified target document to send a text analysis result to the client device.

With reference now to FIG. 4, FIG. 4 illustrates one embodiment of a flowchart of a process, performed in the client device, for generating a modified target document from a target document to send the modified target document from the client device to the server computer.

In step 401, the client device (101) starts the process.

In step 402, the client device (101) may load a target document (483) and the mapping (299) simultaneously or separately.

In step 403, the client device (101) searches for a first character string in the target document (483), the first character string being listed in the mapping (299), and, if found, replaces each first character string in the target document (483) with a second character string, using the mapping (299), to generate the target document in which a first character string was replaced with a second character string. Accordingly, the target document after the replacement (hereinafter also referred to as "a modified target document") is obtained.

Optionally, in step 404, the client device (101) may display a user interface of an application, such as text analysis application, running on the client device (101), which allows a user to select whether the modified target document is to be output before the modified target document is sent to the server computer (121) or not. The client device (101) may judge whether the modified target document is output or not. For example, if the user selects a bottom for outputting the modified target document, the client device (101) may proceed to step 405. Meanwhile, for example, if the user does not select a bottom for outputting the modified target document, the client device (101) may proceed to step 406.

Optionally, in step 405, the client device (101) may output the modified target document. The output is performed, for example, by displaying the modified target document on a display (106), or by printing out the modified target document. The user can confirm the content of the modified target document before the modified target document is sent to the server computer.

Optionally, in step 406, the client device (101) may judge whether the modified target document is to be sent to the server computer (121). If the determination is positive, or the user selected a bottom for sending the modified target document to the server computer (121), the client device (101) may proceed to step 407. Meanwhile, if the determination is not positive, or the user did not select a bottom for sending the modified target document to the server computer (121), the client device (101) may proceed to a final step 408.

In step 407, the client device (101) sends the modified target document (493) to a server computer in order to perform a text analysis for the modified target document (493). The server computer may be the server computer (121) where a text analysis is performed or an intermediate server where the modified target document (493) is sent to the server computer (121).

In step 408, the client device (101) terminates the process for generating a modified target document from a target document to send the modified target document (493) from the client device (101) to the server computer (121).

FIGS. 5A and 5B illustrate embodiments of a flowchart of a process, performed in the server computer, for analyzing the modified target document to send a text analysis result to the client device.

With reference now to FIG. 5A, the process described in FIG. 5A is performed after the termination of the processes described in FIGS. 3A and 4.

In step 501, the server computer (121) starts the process.

In step 502, the server computer (121) receives the modified logic (391) from the client device (101).

In step 503, the server computer (121) receives the modified target document (493) from the client device (101).

The steps 502 and 503 can be performed reversely or simultaneously.

In step 504, the server computer (121) analyzes the modified target document (493), using the modified logic (391). Any method for a text analysis known in the art can be used for analyzing the modified target document (493), using the modified logic (391). For example, IBM® Watson Explorer Analytical Components can be used. After the analysis, the server computer (121) obtains a text analysis result (581) for the modified target document.

In step 505, the server computer (121) or a text analysis application running on the server computer (121) sends the text analysis result (581) to the client device (101). The text analysis result (581) may include, for example, but not limited to, a set or sets of a term and a frequency of appearance of the term.

In step 506, the server computer (121) determines whether another modified target document is received or not. If the determination is positive, the server computer (121) proceeds back to the step 504 in order to repeatedly perform the steps 504 to 506. Meanwhile, if the determination is not positive, the server computer (121) proceeds to a final step 507.

In step 507, the server computer (121) terminates the process for analyzing the modified target document (493) to send a text analysis result (581) to the client device (101).

With reference now to FIG. 5B, the process described in FIG. 5B is performed after the termination of the processes described in FIGS. 3B and 4. In FIG. 5B, a modified morphological analysis dictionary is used in addition to the modified logic, which is different from the process described in FIG. 5A.

In step 511, the server computer (121) starts the process.

In step 512, the server computer (121) receives the modified logic (391) and the modified morphological analysis dictionary (392) from the client device (101) simultaneously or separately.

In step 513, the server computer (121) receives the modified target document (493) from the client device (101).

In step 514, the server computer (121) analyzes the modified target document (493), using the modified logic (391) and the modified morphological analysis dictionary (392). Any method for a text analysis known in the art can be used for analyzing the modified target document (493), using the modified logic (391) and the modified morphological analysis dictionary (392). After the analysis, the server computer (121) obtains a text analysis result (581) for the modified target document.

Steps 515 to 517 correspond to the step 505 to 507 in FIG. 5A, respectively. Accordingly, the explanation of the steps 505 to 507 is applied to the steps 515 to 517 respectively.

Figure 6:
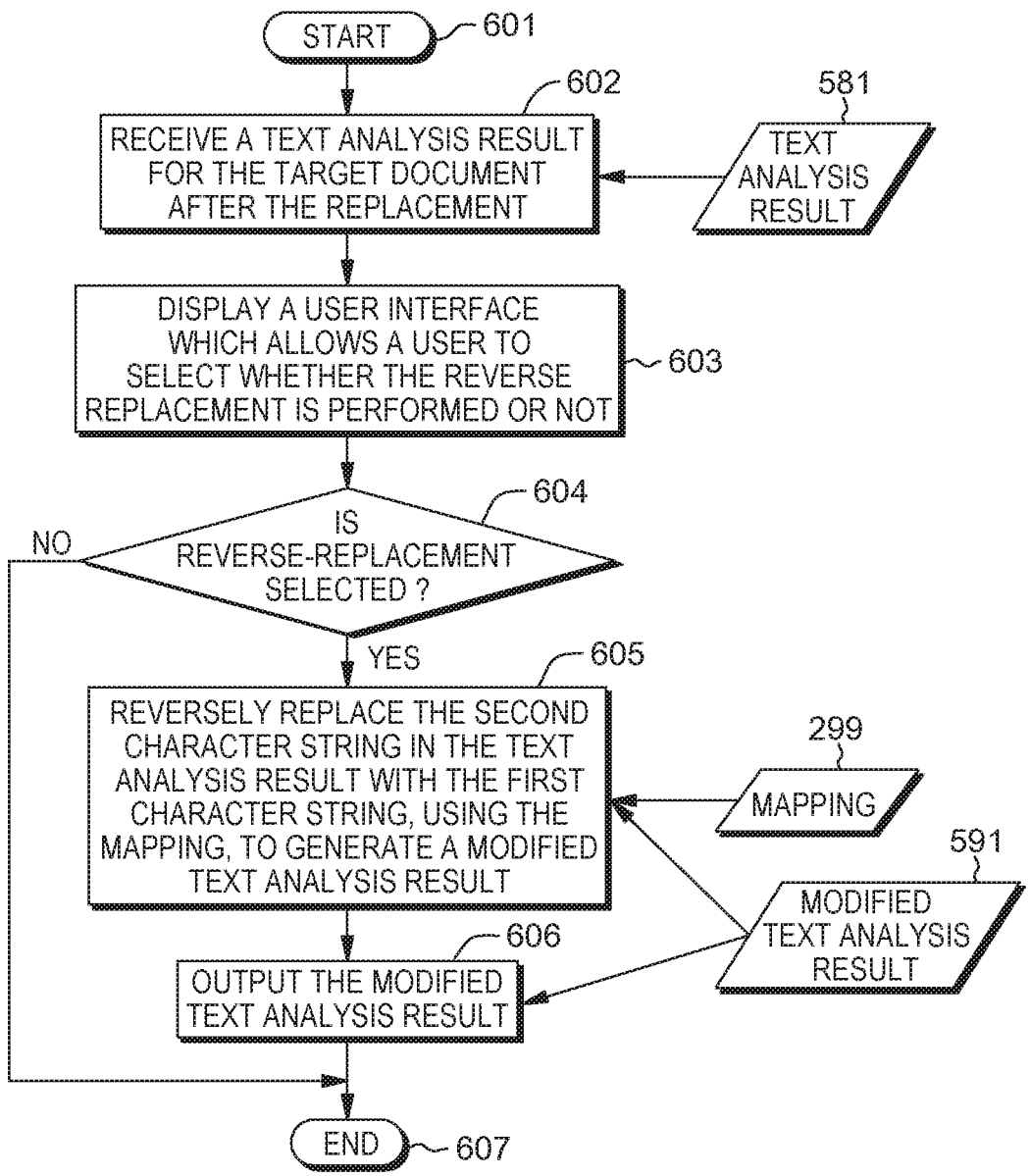
FIG. 6 illustrates one embodiment of a flowchart of a process, performed in the client device, for generating a modified text analysis result from the text analysis result.

With reference now to FIG. 6, FIG. 6 illustrates one embodiment of a flowchart of a process, performed in the client device, for generating a modified text analysis result from the text analysis result.

In step 601, the client device (101) starts the process.

In step 602, the client device (101) receives the text analysis result (581) from the server computer (121) where the text analysis was performed or the intermediate server where the modified target document (493) was sent to or received from the server computer (121).

Optionally, the client device (101) may display the received text analysis result on the display (106), without reversely replacing the second character string in the text analysis result with the first character string. This may be useful when the user found an abnormality in the analysis result and she or he asks an administrator of the serve computer (121) to analysis the abnormality. The user can only inform the displayed text analysis result without the reversely replacement. This guarantees the secure of the data.

Optionally, in step 603, the client device (101) may display a user interface of an application, such as text analysis application, running on the client device (101), which allows a user to select whether a reverse replacement is performed or not.

Optionally, in step 604, the client device (101) may judge whether the reverse replacement is performed or not. For example, if the user selects a bottom for reversely replacing the second character string with the first character string, the client device (101) may proceed to step 604. Meanwhile, for example, if the user does not select a bottom for reversely replacing the second character string with the first character string, the client device (101) may proceed to a final step 607.

Optionally, in step 605, the client device (101) may reversely replace each second character string with the first character string, using the mapping (299) to generate the text analysis result in which a first character string was replaced with a second character string. Accordingly, the text analysis result after the replacement (hereinafter also referred to as "a modified text analysis result") (591) is obtained.

Optionally, in step 606, the client device (101) may output the modified text analysis result (591). The output is performed, for example, by displaying the modified text analysis result on a display (106), or by printing out the modified text analysis result.

In step 607, the client device (101) terminates the process for generating a modified text analysis result from the text analysis result.

Figure 7:
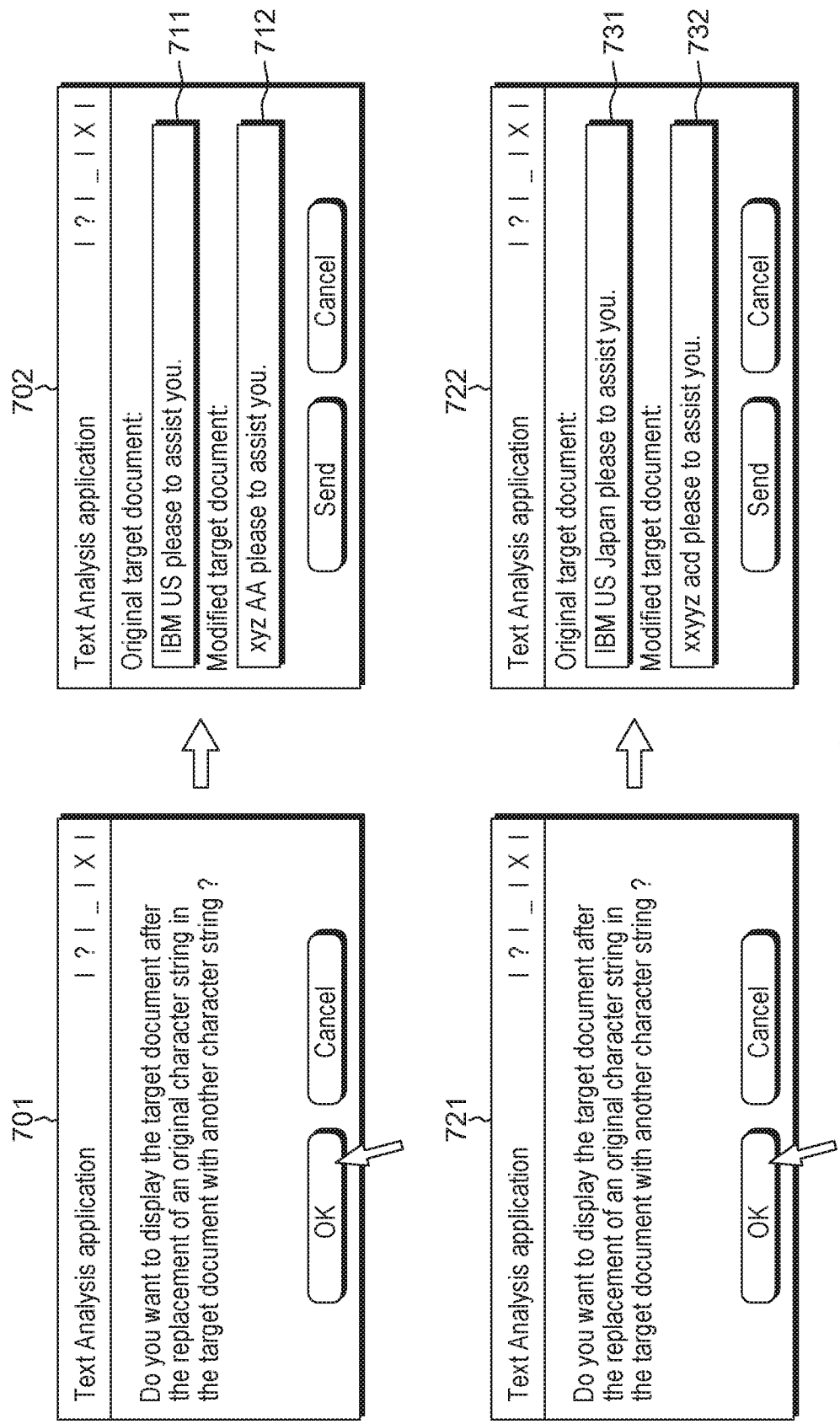
FIG. 7 illustrates embodiments of a user interface for displaying a modified target document generated by different mapping levels.

With reference now to FIG. 7, FIG. 7 illustrates embodiments of a user interface for displaying the modified target document.

The upper windows (701 and 702) show when the Mapping Level 1 is used for generating the modified target document.

The window (701) is displayed when the computer device (101) determines the process of the step 404 described in FIG. 4. If "OK" button is pressed by a user, the client device (101) displays the window (702). The window (702) shows a part (711) of an original target document and a part (712) of a modified target document in which the phrase, "IBM US please to assist you.", was changed to the phrase, "xyz AA please to assist you", by replacing the terms, "IBM" and "US", were replaced with "xyz" and "AA", respectively, using the mapping according to the Mapping Level 1 mentioned above. The client device (101) sends a modified target document including the phrase, "xyz AA please to assist you", to the server computer (121) for a text analysis. Accordingly, even if a third party including an administrator of a server computer sees the phrase, "xyz AA please to assist you", she or he cannot understand or presume the original phrase, "IBM US please to assist you."

The lower windows (721 and 722) show when the Mapping Level 2 is used for generating the modified target document.

The window (721) is displayed when the computer device (101) determines the process of the step 404 described in FIG. 4. If "OK" button is pressed by a user, the client device (101) displays the window (722). The window (722) shows a part (731) of an original target document and a part (732) of a modified target document in which the phrase, "IBM JAPAN please to assist you.", was changed to the phrase, "xxyyz acd please to assist you", by replacing the terms, "IBM" and "Japan", were replaced with "xxyyz" and "acd", respectively, using the mapping according to the Mapping Level 2 mentioned above. The client device (101) sends a modified target document including the phrase, "xxyyz acd please to assist you", to the server computer (121) for a text analysis. Accordingly, even if a third party including an administrator of a server computer sees the phrase, "xxyyz acd please to assist you", she or he cannot understand or presume the original phrase, "IBM JAPAN please to assist you."

Figure 8:
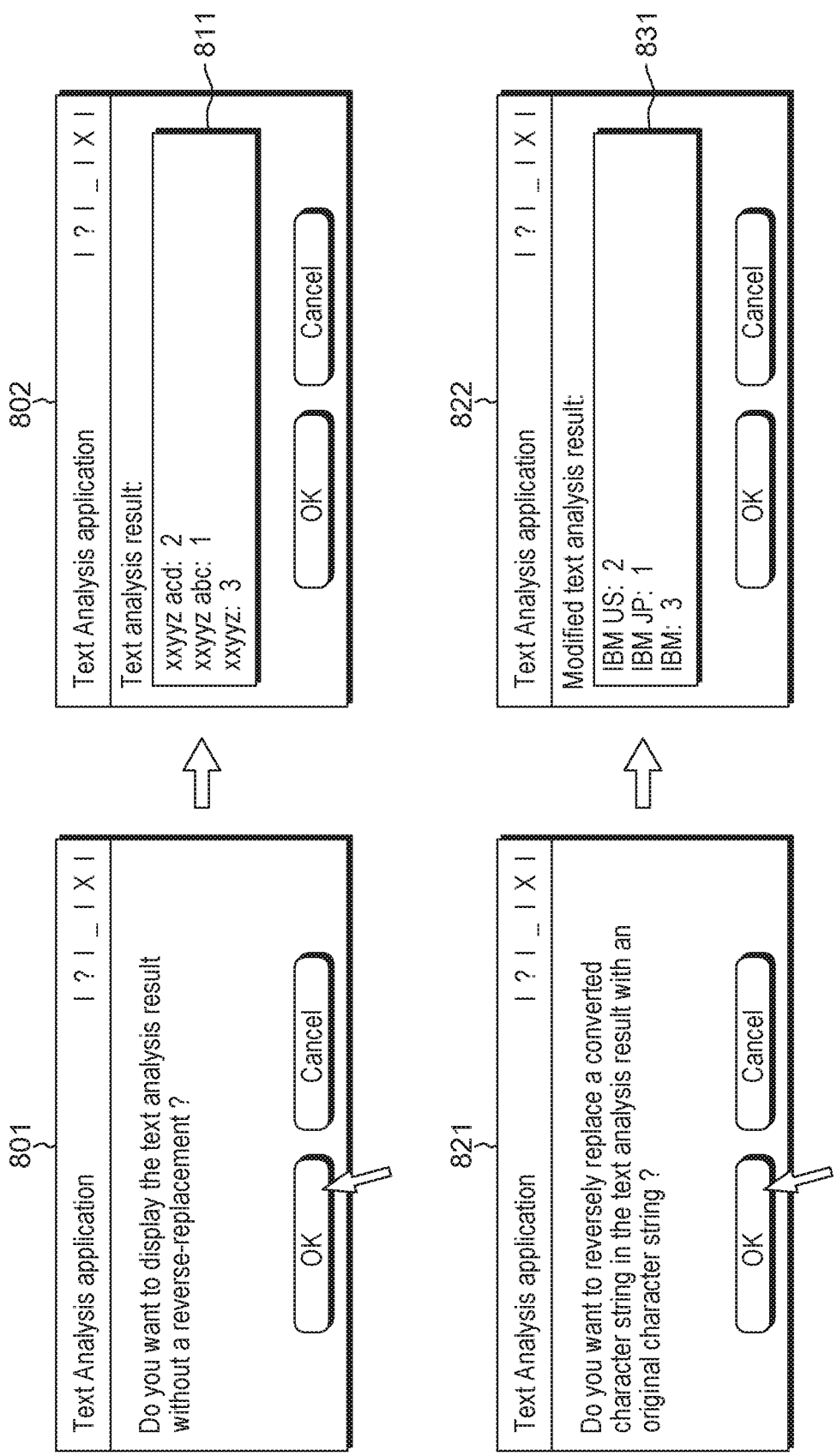
FIG. 8 illustrates embodiments of a user interface for displaying an original text analysis result or the modified text analysis result.

With reference now to FIG. 8, FIG. 8 illustrates embodiments of a user interface for displaying an original text analysis result or the modified text analysis result.

The upper windows (801 and 802) show when the reverse replacement in which a second character string is replaced with a first character string 1 is not performed for the original text analysis result.

The window (801) is displayed when the computer device (101) receives the text analysis result (581) from the server computer (121). If "OK" button is pressed by a user, the client device (101) displays the window (802). The window (802) shows a part (811) of an original text analysis result. The original text analysis result shows that the result of sets of the term and the frequency of appearance of the term, "xxyyz acd" and "2", "xxyyz" and "1" and "xxyyz" and "3". Unless a user associated with the client device (101) remembers the mapping, the user cannot understand or presume the terms, "xxyyz acd", "xxyyz" and "xxyyz", in the original text analysis result.

The lower windows (821 and 822) show when the reverse replacement in which a second character string is replaced with a first character string is performed for the original text analysis result.

The window (821) is displayed when the computer device (101) determines the process of the step 604 described in FIG. 6. If "OK" button is pressed by a user associated with the client device (101), the client device (101) displays the window (822). The window (822) shows a part (831) of the modified original text analysis result in which a second character string is reversely replaced with a first character string, using the mapping according to the Mapping Level 2. The modified text analysis result shows that the result of sets of the term and the frequency of appearance of the term, "IBM US" and "2", "IBM JP" and "1" and "IBM" and "3". Accordingly, the user can fully understand contents of the modified text analysis result.

Figure 9:
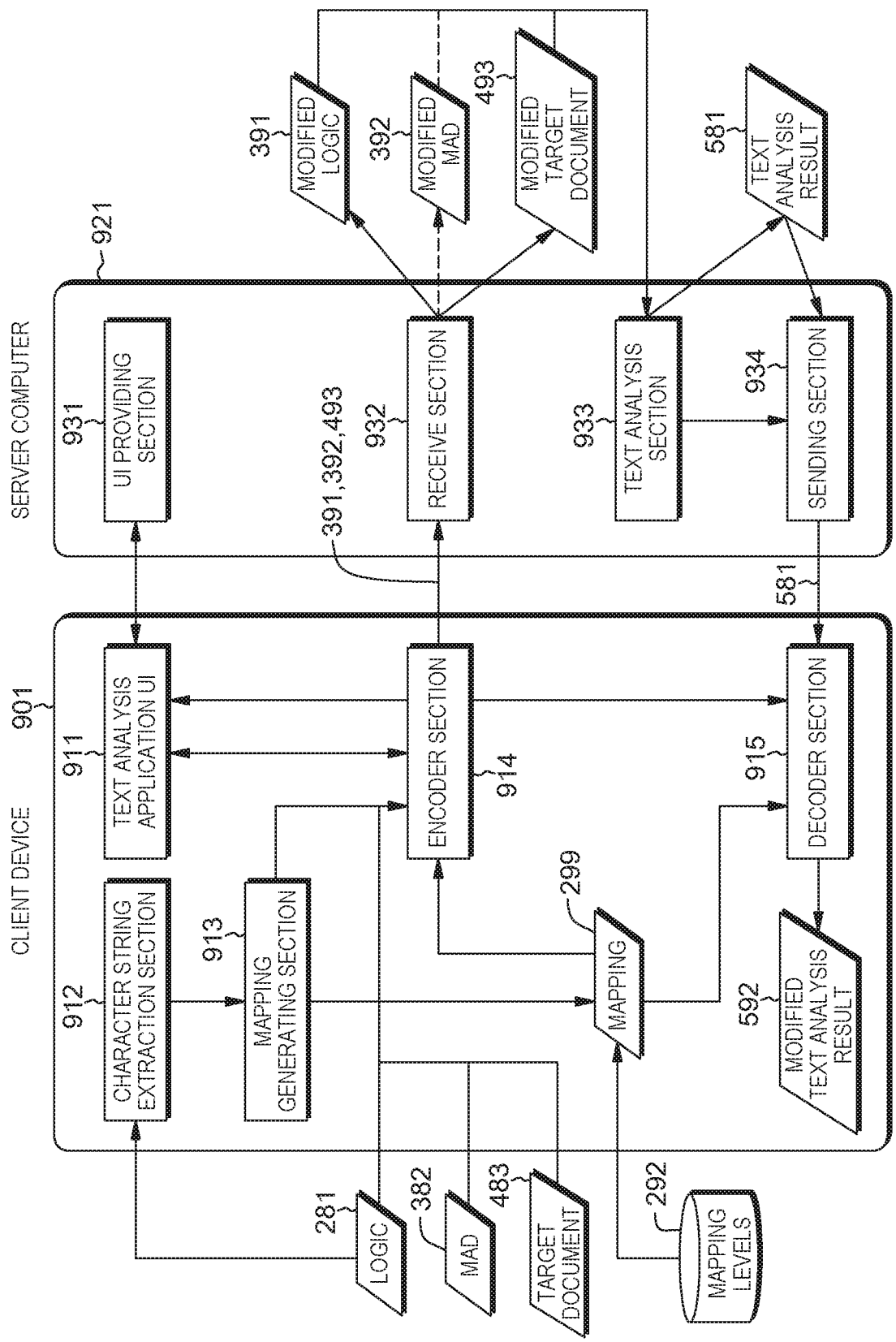
FIG. 9 illustrates one embodiment of an overall functional block diagram of the client device used in accordance with the embodiment of the flowcharts described in FIGS. 2A to 2C, 3A and 3B, 4 and 6 and the server computer used in accordance with the embodiment of the flowcharts described in FIGS. 5A and 5B.

With reference now to FIG. 9, FIG. 9 illustrates an embodiment of an overall functional block diagram of the client device used in accordance with the embodiment of the flowcharts described in FIGS. 2A to 2C, 3A and 3B, 4 and 6 and the server computer used in accordance with the embodiment of the flowcharts described in FIGS. 5A and 5B.

A client device (901) and a server computer (921) correspond to the client device (101) and the server computer (121), respectively.

The client device (901) comprises a text analysis application user interface (UI) (911), a character string extraction section (912), a mapping generation section (913), an encoder section (914), and a decoder section (915).

The text analysis application user interface (UI) (911) may output the modified target document (493), before sending the modified target document (493) to the server computer (921). Further, the text analysis application user interface (UI) (911) may display a user interface which allows a user to select whether the reverse replacement is performed or not. Further, the text analysis application user interface (UI) (911) may output the text analysis result (581) or the modified text analysis result (592).

The text analysis application user interface (UI) (911) may perform the step 405 described in FIG. 4 and the steps 603 and 605 described in FIG. 6.

The character string extraction section (912) may extract the first character string from the logic (281).

The character string extraction section (912) may perform the steps 202 to 203 described in FIG. 2A, the steps 212 to 213 described in FIG. 2B, and the steps 222 to 223 described in FIG. 2C.

The mapping generation section (913) may generate the second character string on the basis of the first character string, so as to generate the mapping (299). Further, the mapping generation section (913) may generate the mapping, according to a mapping level which is selected among a plurality of mapping levels (292). Further, the mapping generation section (913) may generate a mapping (299) by, for example, (a) replacing the first character string with the second character string, without changing a length of the first character string; (b) replacing the first character string with the second character string, with changing a length of the first character string; (c) replacing category information on the first character string with a third character string, in addition to the replacement defined in (a) or (b); or (d) replacing the first character string in a morphological analysis dictionary (382) used for the text analysis with the second character string, in addition to the replacement defined in (a) or (b).

The mapping generation section (913) may perform the step 206 described in FIG. 2A, the steps 214 to 217 described in FIG. 2B, and the steps 224 to 227 described in FIG. 2C.

The encoder section (914) may replace a first character string in a logic used for the text analysis with a second character string which is different from the first character string, using a mapping between the first character string and the second character string. Further, the encoder section (914) may search for a first character string in a target document for the text analysis and replace the first character string, if found, with the second character string, using the mapping (299). Further, the encoder section (914) may send the modified logic (391) to the server computer (921). Further, the encoder section (914) may send the modified target document (493) to the server computer (921).

The encoder section (914) may select a mapping level, depending upon a context of the target document (483), an importance or category associated with the target document (483), an importance or category associated with the logic (281), an importance or category associated with the first character string, a calculation amount required in the client device (901), or a combination thereof. Further, the encoder section (914) may dynamically determine the mapping level among the mapping levels (292). Further, the encoder section (914) may dynamically determine each one mapping level for each first character string among a plurality of first character strings.

The encoder section (914) may perform the steps 302 to 304 described in FIG. 3A, the steps 312 to 314 described in FIG. 3B, and the steps 402 to 407 described in FIG. 4.

The decoder section (915) may receive from the server computer (921) a text analysis result (581) for the modified target document (493). Further, the decoder section (915) may reversely replace a second character string in the text analysis result (581) with the first character string, using the mapping (299).

The decoder section (915) may perform the step 602, 604 and 605 described in FIG. 6.

The server computer (921) comprises a user interface providing section (931), a receiving section (932), a text analysis section (933), and a sending section (934).

The user interface providing section (931) may interact with the text analysis application UI (911) and provide a user interface for the client device (901).

The receiving section (932) may receive the modified logic (391), the modified morphological analysis dictionary (392), and the modified target document (493), which are all sent from the client device (901).

The receiving section (932) may perform the steps 502, 503 and 506 described in FIG. 5A and the steps 512, 513 and 516 described in FIG. 5B.

The text analysis section (933) may perform a text analysis for documents, namely, the modified target document (493), using the modified logic (391) to obtain text analysis result (581). Further the text analysis section (933) may perform a text analysis for documents, using the modified logic (391) and the modified morphological analysis dictionary (392) to obtain text analysis result (581).

The text analysis section (933) may perform the step 504 described in FIG. 5A and the step 514 described in FIG. 5B.

The sending section (934) may send the text analysis result (581) to the client device (901).

The sending section (934) may perform the step 505 described in FIG. 5A and the step 515 described in FIG. 5B.

An example of one embodiment of the present invention will be described below.

Let us suppose that a proper noun dictionary as a logic is prepared and a mapping according to the Mapping level 2 is used for replacing terms in a target document and the proper noun dictionary.

Step 1: The client device (101) prepares the proper noun dictionary comprising entities, ""IBM", proper noun, company name" where "proper noun" corresponds to a category of the term, "IBM" and "company name" corresponds to a sub-category of the category, "proper noun"; and ""Japan", proper noun, country name" where "proper noun" corresponds to a category of the term, "Japan" and "country name" corresponds to a sub-category of the category, "proper noun".

Step 2: The client device (101) prepares a bidirectional mapping. The term, "IBM", is mapped to "xxyyz", according to the Mapping level 2. The term, "Japan", is mapped to "abc", according to the Mapping level 2.

Step 3: The client device (101) replaces a term in a target document with a different character string, according to the mapping, to generate the modified target document. A sentence 1 in the target document, "I'm working for IBM Japan" was converted into "I'm working for xxyyz abc", by replacing the terms, "IBM" and "Japan", in the target document with "xxyyz" and "abc", respectively, using the bidirectional mapping. A sentence 2 in the target document, "I like IBM" was converted into "I like xxyyz", by replacing the term, "IBM", with "xxyyz" using the bidirectional mapping.

Step 4: The client device (101) replaces a term in the proper noun dictionary with a different character string to generate the modified dictionary. The term, "IBM", in an entity, ""IBM", proper noun, company name", in the proper noun dictionary is replaced with "xxyyz", using the bidirectional mapping and, then, the modified entity, ""xxyyz", proper noun, company name" is generated. The term, "Japan", in an entity, ""Japan", proper noun, country name", in the proper noun dictionary is replaced with "abc", using the bidirectional mapping and, then, the modified entity, ""abc", proper noun, country name" is generated. Accordingly, the modified dictionary comprises entities, ""xxyyz", proper noun, company name" and ""abc", proper noun, country name".

Step 5: The client device (101) sends the modified target document and the dictionary to a server computer.

Step 6: The server computer (121) receives the modified target document and the dictionary and, then, performs a text analysis of the modified target document, using the dictionary. As a result of the text analysis, the server computer (121) obtains a text analysis result for the modified target document and, then, sends the text analysis result to the client device (101). The text analysis result includes the following: ""xxyyz", proper noun, company name"—two ("two" means a frequency of appearance of the term, "xxyyz", in the modified target document) and ""abc", proper noun, country name"—one ("one" means a frequency of appearance of the term, "abc", in the modified target document).

Step 7. The client device (101) receives the text analysis result. In accordance with the user instructions, the client device (101) reversely replaces the terms, "xxyyz" and "abc", in the text analysis result with "IBM" and "Japan", respectively, using the bidirectional mapping. Accordingly, the modified analysis text result, ""IBM", proper noun, company name"—two and ""Japan", proper noun, country name"—one, is generated.

Accordingly, it is quite difficult to restore or presume an original target document and an original logic even if a target document which was modified according to one embodiment of the present invention and sent from a client device is seen by a third party, such as an administrator of the server computer. Further, a utilization of a public server, such as a cloud environment, for text analysis can be performed, while preventing a personal or security data being leaked.

In the example mentioned above, a simple text analysis result is shown for easiness of understanding of one embodiment of the present invention.

In one example of the present invention, when one embodiment of the present invention is applied to a language, for example, but not limited to, Japanese, where a word separation changes according to a context, the mapping according to one embodiment of the present invention can be applied for a morphological analysis dictionary. This allows a replacement according to one embodiment of the present invention, without changes the words separation. Accordingly, one embodiment of the present invention can be applied to any language where a word separation changes, according to a context.

The present invention may be a method, a computer system, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

By the expression "a/one" should be understood as "at least one".

By the expression "comprise(s)/comprising a/one" should be understood as "comprise(s)/comprising at least one".

By the expression "comprise(s)/comprising" should be understood as "comprise(s)/comprising at least".

By the expression "/" should be understood as "and/or".

What is claimed is:

1. A computer program product used in text analysis, the computer program product comprising:
   one or more computer readable storage media; and
   program instructions stored on the one or more computer readable storage media, the program instructions comprising:
      program instructions to replace a first character string in a logic, wherein the logic is a format which analyzes input text and extracts additional information used for the text analysis, with a second character string which is different from the first character string, using a mapping between the first character string and the second character string, the first character string being a character or a combination of characters in the logic;
      program instructions to search for a first character string in a target document for the text analysis and replacing the first character string, if found, with the second character string, using the mapping;
      program instructions to send the logic after the replacement to a server computer;
      program instructions to send the target document after the replacement to the server computer; and
      program instructions to receive from the server computer a text analysis result for the target document after the replacement.

2. The computer program product according to claim 1, wherein the mapping is generated according to a mapping level which is selected among a plurality of mapping levels and wherein the mapping level is selected, depending upon one or more of the following: a context of the target document, an importance or category associated with the target document, an importance or category associated with the logic, an importance or category associated with the first character string, and a calculation amount required.

3. The computer program product according to claim 1, wherein the mapping is generated according to a mapping level which is selected among a plurality of mapping levels and wherein the mapping level is dynamically determined.

4. The computer program product according to claim 1, wherein the mapping is generated according to a mapping level which is selected among a plurality of mapping levels and wherein each mapping level is dynamically determined for each first character string of a plurality of first character strings.

5. The computer program product according to claim 1, further comprising:
   program instructions to reversely replace the second character string in the text analysis result with the first character string, using the mapping; and
   program instructions to output the text analysis result after the reverse replacement.

6. The computer program product according to claim 1, further comprising:
   program instructions to reversely replace the second character string in the text analysis result with the first character string, using the mapping; and
   program instructions to display a user interface which allows a user to select whether the reverse replacement is performed.

7. The computer program product according to claim 1, further comprising:
   program instructions to automatically generate the second character string on the basis of the first character string, so as to generate the mapping.

8. The computer program product according to claim 1, further comprising:
   program instructions to automatically extract the first character string from the logic.

9. The computer program product according to claim 1, further comprising:
   program instructions to output the target document after the replacement, before sending the target document after the replacement to the server computer.

10. The computer program product according to claim 1, wherein the logic is used for the text analysis and wherein the logic is one of the following: a dictionary, a regular expression, or a program code.

11. A computer system used in text analysis, the computer system comprising:
   one or more computer processors;
   one or more computer readable storage media; and
   program instructions stored on the one or more computer readable storage media for execution by at least one of the one or more computer processors, the program instructions comprising:
      program instructions to replace a first character string in a logic, wherein the logic is a rule which analyzes input text and extracts additional information used for the text analysis, with a second character string which is different from the first character string, using a mapping between the first character string and the second character string, the first character string being a character or a combination of characters in the logic;

program instructions to search for a first character string in a target document for the text analysis and replacing the first character string, if found, with the second character string, using the mapping;

program instructions to send the logic after the replacement to a server computer;

program instructions to send the target document after the replacement to the server computer; and program instructions to receive from the server computer a text analysis result for the target document after the replacement.

12. The computer system according to claim 11, wherein the mapping is generated according to a mapping level which is selected among a plurality of mapping levels and wherein the mapping level is selected, depending upon one or more of the following: a context of the target document, an importance or category associated with the target document, an importance or category associated with the logic, an importance or category associated with the first character string, and a calculation amount required.

13. The computer system according to claim 11, wherein the mapping is generated according to a mapping level which is selected among a plurality of mapping levels and wherein the mapping level is dynamically determined.

14. The computer system according to claim 11, wherein the mapping is generated according to a mapping level which is selected among a plurality of mapping levels and wherein each mapping level is dynamically determined for each first character string of a plurality of first character strings.

15. The computer system according to claim 11, further comprising:

program instructions to reversely replace the second character string in the text analysis result with the first character string, using the mapping; and program instructions to output the text analysis result after the reverse replacement.

16. The computer system according to claim 11, further comprising:

program instructions to reversely replace the second character string in the text analysis result with the first character string, using the mapping; and program instructions to display a user interface which allows a user to select whether the reverse replacement is performed.

17. The computer system according to claim 11, further comprising:

program instructions to automatically generate the second character string on the basis of the first character string, so as to generate the mapping.

18. The computer system according to claim 11, further comprising:

program instructions to automatically extract the first character string from the logic.

19. The computer system according to claim 11, further comprising:

program instructions to output the target document after the replacement, before sending the target document after the replacement to the server computer.

20. The computer system according to claim 11, wherein the logic is used for the text analysis and wherein the logic is one of the following: a dictionary, a regular expression, or a program code.

* * * * *